(12) United States Patent
Miyatake et al.

(10) Patent No.: US 11,431,023 B2
(45) Date of Patent: Aug. 30, 2022

(54) ALL-SOLID-STATE BATTERY

(71) Applicant: Panasonic Intellectual Property Management Co., Ltd., Osaka (JP)

(72) Inventors: Kazufumi Miyatake, Osaka (JP); Akihiro Horikawa, Osaka (JP); Motohiro Okochi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 16/703,354

(22) Filed: Dec. 4, 2019

(65) Prior Publication Data
US 2020/0194828 A1 Jun. 18, 2020

(30) Foreign Application Priority Data
Dec. 17, 2018 (JP) .............................. JP2018-235722

(51) Int. Cl.
*H01M 10/0562* (2010.01)
*H01M 4/02* (2006.01)
*H01M 4/13* (2010.01)
*H01M 10/0525* (2010.01)
(Continued)

(52) U.S. Cl.
CPC ......... *H01M 10/0562* (2013.01); *H01M 4/13* (2013.01); *H01M 10/0525* (2013.01);
(Continued)

(58) Field of Classification Search
CPC ......... H01M 10/0562; H01M 10/0525; H01M 10/0585; H01M 4/13; H01M 4/621;
(Continued)

(56) References Cited

U.S. PATENT DOCUMENTS

| 9,853,274 B2 | 12/2017 | Tanaka |
| 2013/0323568 A1 | 12/2013 | Tanaka |
| 2016/0380301 A1 | 12/2016 | Kosaka et al. |
| 2017/0309964 A1 | 10/2017 | Iwamoto |
| 2017/0309965 A1 | 10/2017 | Honda |

FOREIGN PATENT DOCUMENTS

| JP | 2005-116248 | 4/2005 |
| JP | 2013-206654 | 10/2013 |

(Continued)

OTHER PUBLICATIONS

EPO machine generated English translation of JP 2005-116248 (Year: 2005).*

(Continued)

*Primary Examiner* — Christopher P Domone
*Assistant Examiner* — Kimberly Wyluda
(74) *Attorney, Agent, or Firm* — Wenderoth, Lind & Ponack L.L.P.

(57) ABSTRACT

An all-solid-state battery includes: a positive electrode layer including a positive electrode current collector and a positive electrode mixture layer; a negative electrode layer including a negative electrode current collector and a negative electrode mixture layer; and a solid electrolyte layer. The solid electrolyte layer is disposed between the positive electrode mixture layer and the negative electrode mixture layer. On a plane perpendicular to a stacking axis, an area of the negative electrode mixture layer is larger than an area of the positive electrode mixture layer. On the stacking axis, an entire portion of the positive electrode mixture layer overlaps a portion of the negative electrode mixture layer.

8 Claims, 2 Drawing Sheets

(51) Int. Cl.
   *H01M 10/0585* (2010.01)
   *H01M 4/62* (2006.01)

(52) U.S. Cl.
   CPC ............ *H01M 4/621* (2013.01); *H01M 4/624* (2013.01); *H01M 10/0585* (2013.01); *H01M 2004/021* (2013.01); *H01M 2004/025* (2013.01); *H01M 2004/027* (2013.01); *H01M 2004/028* (2013.01); *H01M 2300/0065* (2013.01)

(58) Field of Classification Search
   CPC ........... H01M 4/624; H01M 2004/021; H01M 2004/025; H01M 2004/027; H01M 2004/028; H01M 2300/0065
   See application file for complete search history.

(56) References Cited

FOREIGN PATENT DOCUMENTS

| | | |
|---|---|---|
| JP | 5348607 B | 11/2013 |
| JP | 2017-199666 | 11/2017 |
| JP | 2017-199668 | 11/2017 |
| WO | 2012/114497 | 8/2012 |

OTHER PUBLICATIONS

EPO machine generated English translation of CN 205194796U (Year: 2016).*

Extended European Search Report dated May 12, 2020 in corresponding European Patent Application No. 19216407.7.

* cited by examiner

ALL-SOLID-STATE BATTERY

BACKGROUND

1. Technical Field

The present disclosure relates to an all-solid-state battery including a positive electrode layer, a negative electrode layer, and a solid electrolyte layer.

2. Description of the Related Art

Recently, development of a secondary battery that can be repeatedly used has been required along with a reduction in weight of an electronic apparatus such as a personal computer or a cellular phone and manufacturing of cordless electronic apparatuses. Examples of the secondary battery include a nickel-cadmium battery, a nickel-metal hydride battery, a lead storage battery, and a lithium ion battery. In particular, the lithium ion battery has characteristics such as light weight, high voltage, and high energy density, and thus has attracted attention.

The lithium ion battery includes a positive electrode layer, and a negative electrode layer, and an electrolyte that is disposed between the positive electrode layer and the negative electrode layer. As the electrolyte, for example, an electrolytic solution or a solid electrolyte in which a supporting electrolyte such as lithium hexafluorophosphate is dissolved in an organic solvent is used. A lithium ion battery that is currently widely used has combustibility because an electrolytic solution including an organic solvent is used therein. Therefore, a material, a structure, and a system for securing safety of the lithium ion battery are required. On the other hand, by using an incombustible solid electrolyte as the electrolyte, simplification of the material, the structure, and the system can be expected, and it is considered that an increase in energy density, a reduction in manufacturing costs, and improvement of productivity can be achieved. Hereinafter, the lithium ion battery using the solid electrolyte will be referred to as "all-solid-state battery".

The solid electrolyte can be roughly divided into an organic solid electrolyte and an inorganic solid electrolyte. The organic solid electrolyte has an ion conductivity of about $10^{-6}$ S/cm at 25° C., which is much lower than $10^{-3}$ S/cm as an ion conductivity of an electrolytic solution. Therefore, it is difficult to operate the all-solid-state battery using the organic solid electrolyte in an environment at 25° C. Examples of the inorganic solid electrolyte include an oxide solid electrolyte and a sulfide solid electrolyte. The ion conductivities of these inorganic solid electrolytes are about $10^{-4}$ to $10^{-3}$ S/cm and are relatively high. The oxide solid electrolyte has a high grain boundary resistivity. Therefore, as means for reducing the grain boundary resistivity, sintering of powder and thinning are considered. In the case of sintering, a constituent element of a positive electrode or a negative electrode and a constituent element of a solid electrolyte are diffused to each other due to a treatment at a high temperature, and thus it is difficult to obtain sufficient characteristics. Therefore, in the all-solid-state battery using the oxide solid electrolyte, thinning is mainly considered. On the other hand, since the sulfide solid electrolyte has a lower grain boundary resistivity than the oxide solid electrolyte, excellent characteristics can be obtained with only compression molding of powder. Therefore, recently, the sulfide solid electrolyte has been actively studied.

In the all-solid-state battery, along with repeated charging and discharging, metallic lithium may grow on the negative electrode layer, and the grown metallic lithium may move up to the positive electrode mixture layer. Japanese Patent No. 5348607 discloses an all-solid-state battery in which contact between grown metallic lithium and a positive electrode side can be suppressed by forming a dense film on a surface of a solid electrolyte layer in order to improve reliability of the all-solid-state battery.

SUMMARY

An all-solid-state battery according to one aspect of the present disclosure includes a positive electrode layer, a negative electrode layer, and a solid electrolyte layer. The positive electrode layer includes a positive electrode current collector and a positive electrode mixture layer. The positive electrode mixture layer includes a positive electrode active material and a solid electrolyte and is stacked on the positive electrode current collector along a stacking axis. The negative electrode layer includes a negative electrode current collector and a negative electrode mixture layer. The negative electrode mixture layer includes a negative electrode active material and a solid electrolyte and is stacked on the negative electrode current collector along the stacking axis. The solid electrolyte layer includes a solid electrolyte having ion conductivity and is disposed between the positive electrode mixture layer and the negative electrode mixture layer. On a plane perpendicular to the stacking axis, an area of the negative electrode mixture layer is larger than an area of the positive electrode mixture layer. On the stacking axis, an entire portion of the positive electrode mixture layer overlaps a portion of the negative electrode mixture layer.

DETAILED DESCRIPTION

In an all-solid-state battery of the related art, contact between grown metallic lithium and a positive electrode can be suppressed. However, formation of metallic lithium itself cannot be suppressed. Therefore, the present disclosure provides an all-solid-state battery having higher reliability.

Finding of Present Disclosure

Figure 1:
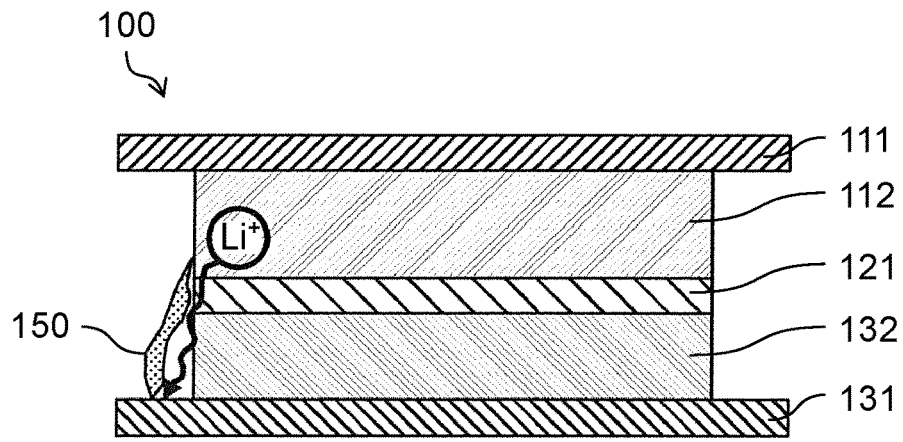
FIG. 1 is a cross-sectional view illustrating an all-solid-state battery of the related art.

FIG. 1 illustrates all-solid-state battery 100 of the related art. All-solid-state battery 100 of the related art includes positive electrode current collector 111, positive electrode mixture layer 112, solid electrolyte layer 121, negative electrode mixture layer 132, and negative electrode current collector 131. In all-solid-state battery 100 of the related art, as illustrated in FIG. 1, in a region of negative electrode current collector 131 where negative electrode mixture layer 132 is not stacked, formation and growth of metallic lithium 150 cannot be suppressed. Therefore, metallic lithium 150 moves up to positive electrode mixture layer 112, which causes deterioration in reliability.

Therefore, the present disclosure provides an all-solid-state battery having higher reliability. In particular, the present disclosure provides an all-solid-state battery having higher reliability by suppressing precipitation of metallic lithium on a negative electrode current collector.

An all-solid-state battery according to one aspect of the present disclosure includes a positive electrode layer, a negative electrode layer, and a solid electrolyte layer. The positive electrode layer includes a positive electrode current collector and a positive electrode mixture layer, the positive electrode mixture layer being stacked on the positive electrode current collector along a stacking axis and including a positive electrode active material and a solid electrolyte. The negative electrode layer includes a negative electrode current collector and a negative electrode mixture layer, the negative electrode mixture layer being stacked on the negative electrode current collector along the stacking axis and including a negative electrode active material and a solid electrolyte. The solid electrolyte layer is disposed between the positive electrode mixture layer and the negative electrode mixture layer and includes a solid electrolyte having ion conductivity. On a plane perpendicular to the stacking axis, an area of the negative electrode mixture layer is larger than an area of the positive electrode mixture layer. On the stacking axis, an entire portion of the positive electrode mixture layer overlaps a portion of the negative electrode mixture layer.

As a result, the negative electrode mixture layer is present at a position facing the positive electrode mixture layer. Therefore, lithium ions that move from the positive electrode mixture layer to the negative electrode mixture layer side can be suppressed from moving to a region of the negative electrode current collector where the negative electrode mixture layer is not stacked. Accordingly, precipitation of metallic lithium on the negative electrode current collector can be suppressed, and an all-solid-state battery having higher reliability can be obtained.

In addition, for example, the positive electrode mixture layer may be positioned inside of an outer peripheral portion of the negative electrode mixture layer on the plane and may have a protrusion portion extending toward the negative electrode mixture layer, and the negative electrode mixture layer may have a recessed portion facing the protrusion portion.

In addition, for example, a portion of the positive electrode mixture layer having a larger thickness on the stacking axis (the stacking direction) than a thickness of the outer peripheral portion on the plane on the stacking axis may be provided inside of the outer peripheral portion of the positive electrode mixture layer on the plane, and a thickness of the negative electrode mixture layer on the stacking axis at a position facing the portion of the positive electrode mixture layer having a larger thickness on the stacking axis than the thickness of the outer peripheral portion on the plane on the stacking axis may be smaller than a thickness of an outer peripheral portion of the negative electrode mixture layer on the plane on the stacking axis.

As a result, the protrusion portion of the positive electrode mixture layer is covered with the recessed portion of the negative electrode mixture layer. Therefore, the negative electrode mixture layer is more likely to receive lithium ions moving from the positive electrode mixture layer. Accordingly, lithium ions are further suppressed from moving to a region of the negative electrode current collector where the negative electrode mixture layer is not stacked.

In addition, for example, the protrusion portion may be positioned at a center portion of the positive electrode mixture layer on the plane.

In addition, for example, a thickness of the center portion of the positive electrode mixture layer on the plane on the stacking axis may be larger than the thickness of the outer peripheral portion of the positive electrode mixture layer on the plane on the stacking axis, and a thickness of a center portion of the negative electrode mixture layer on the plane on the stacking axis may be smaller than the thickness of the outer peripheral portion of the negative electrode mixture layer on the plane on the stacking axis.

As a result, the center portion of the positive electrode mixture layer is covered with the negative electrode mixture layer. Therefore, the negative electrode mixture layer is more likely to receive lithium ions moving from the positive electrode mixture layer. Accordingly, lithium ions are further suppressed from moving to a region of the negative electrode current collector where the negative electrode mixture layer is not stacked.

In addition, for example, a thickness of the center portion of the positive electrode mixture layer on the stacking axis may be the largest in the positive electrode mixture layer, and a thickness of a center portion of the negative electrode mixture layer on the plane on the stacking axis may be the smallest in the negative electrode mixture layer.

As a result, the negative electrode mixture layer is disposed so as to cover the entire negative electrode mixture layer side of the positive electrode mixture layer. Therefore, the negative electrode mixture layer is more likely to receive lithium ions moving from the positive electrode mixture layer. Accordingly, lithium ions are further suppressed from moving to a region of the negative electrode current collector where the negative electrode mixture layer is not stacked.

In addition, for example, a thickness of a portion of the positive electrode mixture layer having the largest thickness on the stacking axis is 103% or higher and 110% or lower of a thickness of the outer peripheral portion of the positive electrode mixture layer on the stacking axis.

As a result, a difference in the thickness of the positive electrode mixture layer on the stacking axis is within a predetermined value. Therefore, a difference in the amount of the positive electrode active material between the portion of the positive electrode mixture layer having the largest thickness on the stacking axis and the outer peripheral portion of the positive electrode mixture layer is suppressed. Accordingly, a variation in charge-discharge characteristics on the plane of the all-solid-state battery can be suppressed, and the reliability of the all-solid-state battery is further improved.

In addition, for example, a thickness of a portion of the negative electrode mixture layer having the smallest thickness on the stacking axis may be 90% or higher and 97% or lower of a thickness of the negative electrode mixture layer on the stacking axis at a position facing the outer peripheral portion of the positive electrode mixture layer.

As a result, a difference in the thickness of the negative electrode mixture layer on the stacking axis is within a predetermined value. Therefore, a difference in the amount of the negative electrode active material included in the negative electrode mixture layer between the respective portions on the plane is suppressed. Accordingly, a variation in charge-discharge characteristics in a plane direction of the all-solid-state battery can be suppressed, and the reliability of the all-solid-state battery is further improved. In addition, the negative electrode mixture layer has a recessed shape suitable for further receiving lithium ions. Therefore, the negative electrode mixture layer is more likely to receive lithium ions moving from the positive electrode mixture layer. Accordingly, lithium ions are further suppressed from moving to a region of the negative electrode current collector where the negative electrode mixture layer is not stacked.

In addition, for example, a difference between a thickness of the solid electrolyte layer on the stacking axis at a position facing the portion of the positive electrode mixture layer having the largest thickness on the stacking axis and a thickness of the solid electrolyte layer on the stacking axis at a position facing the outer peripheral portion of the positive electrode mixture layer on the plane may be 5% or lower of the thickness of the solid electrolyte layer on the stacking axis at the position facing the portion of the positive electrode mixture layer having the largest thickness on the stacking axis.

As a result, a variation in distance between the positive electrode mixture layer and the negative electrode mixture layer can be suppressed. Therefore, the charge and discharge of the all-solid-state battery is stabilized, and the reliability of the all-solid-state battery is further improved.

In addition, for example, in the all-solid-state battery of any one, at least one of the positive electrode mixture layer and the negative electrode mixture layer may include a binder.

As a result, binding properties of a positive electrode active material, a negative electrode active material, and a solid electrolyte included in the positive electrode mixture layer, the negative electrode mixture layer, and the solid electrolyte layer are improved. In addition, binding properties between the positive electrode mixture layer and the positive electrode current collector and binding properties between the negative electrode mixture layer and the negative electrode current collector are also improved. Accordingly, the all-solid-state battery having high reliability in which the respective layers and the materials of the respective layers are not likely to be separated can be obtained.

In addition, for example, in the all-solid-state battery, at least one of the positive electrode mixture layer and the negative electrode mixture layer may include a conductive additive.

As a result, the electron conductivity in the positive electrode mixture layer and the negative electrode mixture layer increases, and an electron conduction path is likely to be secured. Accordingly, the amount of a current that can flow through an electron conduction path increases, and thus charge-discharge characteristics of the all-solid-state battery are improved.

In addition, for example, in the all-solid-state battery, a concentration of a solvent in at least one of the positive electrode mixture layer and the negative electrode mixture layer may be 10 ppm or lower.

As a result, the amount of the solvent not contributing to the battery capacity in the positive electrode mixture layer and the negative electrode mixture layer is small. Accordingly, the capacity of the all-solid-state battery is improved. In addition, the solvent remaining in the positive electrode mixture layer and the negative electrode mixture layer is not likely to be gasified, and bubbles are not likely to be formed. Therefore, the reliability of the all-solid-state battery is improved.

Hereinafter, an all-solid-state battery according to an embodiment of the present disclosure will be described with reference to the drawings. The following embodiment describes a specific example of the present disclosure, and a numerical value, a shape, a material, a component, a disposition position and a connection form of a component, and the like are merely exemplary and are not intended to limit the present disclosure. In addition, among components in the following embodiment, a component that is not described in the independent claim indicating the broadest concept of the present disclosure will be described as an optional component.

In addition, each of the drawings is a schematic diagram in which components are appropriately emphasized or not illustrated or ratios therebetween are adjusted in order to illustrate the present disclosure. A shape, a positional relationship, and a ratio are not necessarily strictly illustrated and may be different from the actual ones. In each of the drawings, substantially the same components are represented by the same reference numerals, and repeated description will not be made or simplified.

In addition, in this specification, a term such as parallel representing a relationship between components, a term such as rectangular representing a shape of a component, and a numerical range are not strictly restricted to those described in this specification and include a substantially equivalent term or range. For example, a difference of several percentages are allowed, and "the same area" represents that the area is within a range of ±5%.

In addition, in this specification, "plan view" refers to a view illustrating the all-solid-state battery in the stacking direction of the all-solid-state battery. In this specification, "thickness" refers to the length of each of the all-solid-state battery and the respective layers in the stacking direction. Here, the stacking direction refers to a direction in which one member constituting the all-solid-state battery is stacked on another member constituting the all-solid-state battery. In the embodiment, the stacking direction is a positive or negative direction of a Z-axis in FIGS. 2 to 4. In addition, an axis (in FIGS. 2 to 4, the Z-axis) along the stacking direction will be referred to as "stacking axis". The plane perpendicular to the stacking axis refers to an X-Y plane in FIGS. 2 to 4.

In addition, in this specification, "in", "center", and "out" of "inside", "center portion", "outer peripheral portion", "outermost portion", and the like refer to "in", "center", and "out" when the all-solid-state battery is seen along the stacking direction of the all-solid-state battery.

In addition, terms "upper" and "lower" in the configuration of the all-solid-state battery do not refer to an upper direction (vertical upper) and a lower direction (vertical lower) in the absolute space recognition, and are used as terms defined by a positional relationship relative to the stacking order in the stack configuration. In addition, the terms "upper" and "lower" are applied not only to a case where two components are disposed with a distance such that another component is present between the two components but also to a case where two components are closely disposed in contact with each other.

In addition, in this specification, a cross-sectional view illustrates a cross-section obtained by cutting the center of the all-solid-state battery in a plan view in the stacking direction.

Embodiment

Hereinafter, an all-solid-state battery according to an embodiment and a positive electrode layer, a negative electrode layer, and a solid electrolyte layer constituting the all-solid-state battery will be described in detail with reference to the drawings.

A. All-Solid-State Battery

Figure 2:
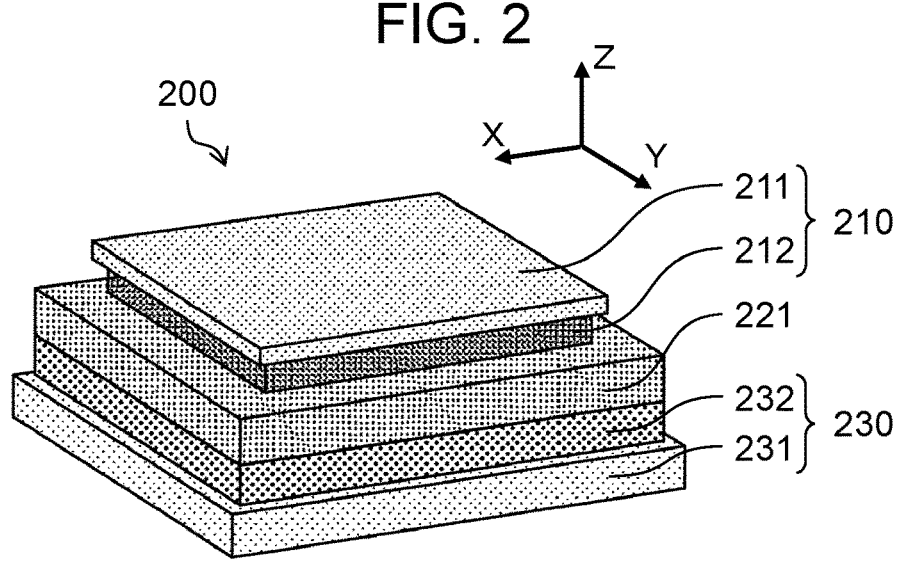
FIG. 2 is a perspective view illustrating an all-solid-state battery according to the present disclosure.

The all-solid-state battery according to the embodiment will be described using FIG. 2. FIG. 2 is a schematic perspective view illustrating all-solid-state battery 200 according to the embodiment.

As illustrated in FIG. 2, all-solid-state battery 200 according to the embodiment includes, for example, positive electrode layer 210, negative electrode layer 230, and solid electrolyte layer 221. Positive electrode layer 210 includes: positive electrode current collector 211; and positive electrode mixture layer 212 that is stacked on positive electrode current collector 211. Negative electrode layer 230 includes: negative electrode current collector 231; and negative electrode mixture layer 232 that is stacked on negative electrode current collector 231. Solid electrolyte layer 221 is disposed between positive electrode mixture layer 212 and negative electrode mixture layer 232 and includes at least a solid electrolyte having ion conductivity. In addition, in all-solid-state battery 200, in a plan view from the stacking direction (on a plane perpendicular to the stacking axis), the area of negative electrode mixture layer 232 is larger than the area of positive electrode mixture layer 212. In addition, in all-solid-state battery 200, on the stacking axis, an entire portion of positive electrode mixture layer 212 overlaps a portion of negative electrode mixture layer 232.

In FIG. 2, all-solid-state battery 200 has a structure in which positive electrode current collector 211, positive electrode mixture layer 212, solid electrolyte layer 221, negative electrode mixture layer 232, and negative electrode current collector 231 that have rectangular shapes in a plan views (X-Y plane), respectively, are disposed in this order from the top. In a plan view, the area of negative electrode mixture layer 232 is the same as the area of solid electrolyte layer 221 and is larger than the area of positive electrode mixture layer 212.

B. Positive Electrode Layer

Positive electrode layer 210 according to the embodiment will be described using FIG. 2.

For example, positive electrode layer 210 according to the embodiment includes: positive electrode current collector 211 that is formed of a metal foil; and positive electrode mixture layer 212 that is stacked on positive electrode current collector 211 along the stacking axis. In a plan view, the area of positive electrode current collector 211 is larger than the area of positive electrode mixture layer 212.

B-1. Positive Electrode Mixture Layer

Positive electrode mixture layer 212 is a film-shaped layer including a positive electrode active material and a solid electrolyte as a positive electrode mixture. Positive electrode mixture layer 212 optionally further includes a binder and a conductive additive.

B-1-1. Positive Electrode Active Material

Hereinafter, the positive electrode active material according to the embodiment will be described.

The positive electrode active material refers to a material that intercalates or deintercalates metal ions such as lithium (Li) ions in a crystalline structure at a higher potential than that of negative electrode layer 230 to be oxidized or reduced with the intercalation or deintercalation of the metal ions such as lithium ions. The kind of the positive electrode active material is appropriately selected depending on the kind of all-solid-state battery 200, and examples thereof include an oxide active material and a sulfide active material.

As the positive electrode active material according to the embodiment, for example, an oxide active material (lithium-containing transition metal oxide) is used. Examples of the oxide active material include $LiCoO_2$, $LiNiO_2$, $LiMn_2O_4$, $LiCoPO_4$, $LiNiPO_4$, $LiFePO_4$, $LiMnPO_4$, and a compound obtained by substituting transition metal in the above-described compound with one or two heteroelements. As the compound obtained by substituting transition metal in the above-described compound with one or two heteroelements, a well-known material such as $LiNi_{1/3}Co_{1/3}Mn_{1/3}O_2$, $LiNi_{0.8}Co_{0.15}Al_{0.05}O_2$, or $LiNi_{0.5}Mn_{1.5}O_2$ is used. As the positive electrode active material, one compound may be used alone, two or more compounds may be used in combination.

Examples of a shape of the positive electrode active material include a particle shape and a thin film shape. When the positive electrode active material has a particle shape, an average particle size ($D_{50}$) of the positive electrode active material is, for example, preferably in a range of 50 nm or more and 50 μm or less and more preferably in a range of 1 μm or more and 15 μm or less. By adjusting the average particle size of the positive electrode active material to be 50 nm or more, the operability is likely to be improved. On the other hand, by adjusting the average particle size to be 50 μm or less, the flat positive electrode layer is likely to be obtained. Therefore, the above-described range is preferable. "Average particle size" described in this specification is a volume average particle size measured using a laser scattering particle size distribution analyzer.

The content of the positive electrode active material in positive electrode mixture layer 212 is not particularly limited and, for example, is preferably 70 wt % or higher and 100% wt % or less. By adjusting the content of the positive electrode active material in positive electrode mixture layer 212 to be 70 wt % or higher, all-solid-state battery 200 having a sufficient charge-discharge capacity is likely to be obtained. Therefore, the above-described range is preferable.

A surface of the positive electrode active material may be coated with a coating layer. The reason for providing the coating layer is to suppress a reaction between the positive electrode active material (for example, an oxide active material) and the solid electrolyte (for example, a sulfide solid electrolyte). Examples of a material of the coating layer include a Li ion conducting oxide such as $LiNbO_3$, $Li_3PO_4$, or LiPON. The average thickness of the coating layer is, for example, preferably in a range of 1 nm or more and 10 nm or less.

Regarding a ratio between the positive electrode active material and the solid electrolyte included in positive electrode mixture layer 212, when a value obtained by dividing the weight of the positive electrode active material by the weight of the solid electrolyte is set as a weight ratio, the weight ratio is preferably in a range of 1 to 19. The reason why the weight ratio is preferably in the above-described range is that both a lithium ion conduction path and an electron conduction path in positive electrode mixture layer 212 are likely to be secured.

B-1-2. Solid Electrolyte

Hereinafter, the solid electrolyte according to the embodiment will be described.

As described above, positive electrode mixture layer 212 according to the embodiment illustrated in FIG. 2 includes a positive electrode active material and a solid electrolyte. The solid electrolyte may be appropriately selected depending on a conducting ion species (for example, a lithium ion) and, for example, can be roughly classified into a sulfide solid electrolyte and an oxide solid electrolyte.

The kind of the sulfide solid electrolyte in the embodiment is not particularly limited, and examples of the sulfide solid electrolyte include $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, and $Li_2S$—$P_2S_5$. In particular, from the viewpoint of excellent lithium ion conductivity, it is preferable that the sulfide solid electrolyte includes Li, P, and S. As the sulfide solid electrolyte, one material may be used alone, or two or more kinds may be used in combination. In addition, the sulfide solid electrolyte may be crystalline, amorphous, or a glass ceramic. The expression "$Li_2S$—$P_2S_5$" refers to a sulfide solid electrolyte formed of a raw material composition including $Li_2S$ and $P_2S_5$, and the same can be applied to other expressions.

In the embodiment, one form of the sulfide solid electrolyte is a sulfide glass ceramic including $Li_2S$ and $P_2S_5$. Regarding a ratio between $Li_2S$ and $P_2S_5$, when a value obtained by dividing the moles of $Li_2S$ by the moles of $P_2S_5$ is set as a molar ratio, the molar ratio is preferably in a range of 1 or higher and 4 or lower. The reason why the molar ratio is preferably in the above-described range is that a crystalline structure having high ion conductivity can be obtained while maintaining the lithium concentration that affects battery characteristics.

Examples of a shape of the sulfide solid electrolyte in the embodiment include a particle shape such as a spherical shape or an oval spherical shape and a thin film shape. When the sulfide solid electrolyte material has a particle shape, the average particle size ($D_{50}$) of the sulfide solid electrolyte is not particularly limited and is preferably 10 μm or less from the viewpoint of improving the density in the positive electrode layer.

Next, the oxide solid electrolyte according to the embodiment will be described. The kind of the oxide solid electrolyte is not particularly limited, and examples thereof include LiPON, $Li_3PO_4$, $Li_2SiO_2$, $Li_2SiO_4$, $Li_{0.5}La_{0.5}TiO_3$, $Li_{1.3}Al_{0.3}Ti_{=0.7}(PO_4)_3$, $La_{0.51}Li_{0.34}Ti_{0.74}$, and $Li_{1.5}Al_{0.5}Ge_{1.5}(PO_4)_3$. As the oxide solid electrolyte, one material may be used alone, or two or more kinds may be used in combination.

In addition, the kind and the particle size of the solid electrolyte included in positive electrode mixture layer 212, negative electrode mixture layer 232, and solid electrolyte layer 221 may vary depending on the respective layers.

B-1-3. Binder

Hereinafter, the binder according to the embodiment will be described.

The binder included in positive electrode mixture layer 212 functions to bind particles of the positive electrode active material, to bind the positive electrode active material and the solid electrolyte, to bind particles of the solid electrolyte, to bind the positive electrode active material and positive electrode current collector 211, to bind the solid electrolyte and positive electrode current collector 211, to bind the positive electrode active material and solid electrolyte layer 221, and to bind the solid electrolyte and solid electrolyte layer 221.

Although the description is repeated, positive electrode mixture layer 212 may or may not include a binder. When positive electrode mixture layer 212 does not include a binder as an adhesive, for example, a method of using the solid electrolyte as an adhesive instead of a binder may be used.

Specific examples of the binder include a synthetic rubber such as butadiene rubber, isoprene rubber, styrene-butadiene rubber (SBR), a styrene-butadiene-styrene copolymer (SBS), a styrene-ethylene-butadiene-styrene copolymer (SEBS), ethylene-propylene rubber, butyl rubber, chloroprene rubber, acrylonitrile-butadiene rubber, acrylic rubber, silicone rubber, fluororubber, or urethane rubber, polyvinylidene fluoride (PVDF), a polyvinylidene fluoride-hexafluoropropylene copolymer (PVDF-HFP), polyimide, polyamide, polyamideimide, polyvinyl alcohol, and chlorinated polyethylene (CPE).

B-1-4. Conductive Additive

Hereinafter, the conductive additive according to the embodiment will be described.

In all-solid-state battery 200 according to the embodiment, positive electrode mixture layer 212 may include the conductive additive.

By adding the conductive additive to positive electrode mixture layer 212, the electron conductivity in positive electrode mixture layer 212 can be increased. Therefore, an electron conduction path in positive electrode mixture layer 212 can be secured, and the internal resistance of all-solid-state battery 200 can be reduced. As a result, the amount of a current that can flow through an electron conduction path increases, and thus charge-discharge characteristics of the all-solid-state battery are improved.

The conductive additive according to the embodiment is not particularly limited as long as it improves the electron conductivity of positive electrode mixture layer 212, and examples thereof include acetylene black, Ketjen black, carbon black, graphite, carbon fibers, and carbon nanotubes. As the conductive additive, one material may be used alone, or two or more kinds may be used in combination.

B-2. Positive Electrode Current Collector

As positive electrode current collector 211, for example, a foil-shaped body, a plate-shaped body, or a net-shaped body formed of aluminum, gold, platinum, zinc, copper, SUS, nickel, tin, titanium, or an alloy of two or more kinds thereof can be used.

In addition, the thickness and the shape of positive electrode current collector 211 may be appropriately selected depending on the use of all-solid-state battery 200.

C. Negative Electrode Layer

Negative electrode layer 230 according to the embodiment will be described using FIG. 2.

For example, negative electrode layer 230 according to the embodiment includes: negative electrode current collector 231 that is formed of a metal foil; and negative electrode mixture layer 232 that is stacked on negative electrode current collector 231 along a stacking axis.

C-1. Negative Electrode Mixture Layer

Negative electrode mixture layer 232 is a film-shaped layer including a negative electrode active material and a solid electrolyte as a negative electrode mixture. Negative electrode mixture layer 232 optionally further includes a binder and a conductive additive.

C-1-1. Negative Electrode Active Material

Hereinafter, the negative electrode active material according to the embodiment will be described.

The negative electrode active material refers to a material that intercalates or deintercalates metal ions such as lithium ions in a crystalline structure at a lower potential than that of positive electrode layer 210 to be oxidized or reduced with the intercalation or deintercalation of the metal ions such as lithium ions.

As the negative electrode active material according to the embodiment, for example, a well-known material can be used, and examples of the well-known material include a metal that can easily form an alloy with a lithium, such as lithium, indium, tin, or silicon, a carbon material such as hard carbon or graphite, and an oxide active material such as $Li_4Ti_5O_{12}$ or $SiO_x$. In addition, as the negative electrode active material, a composite obtained by appropriately mixing the above-described negative electrode active materials may be used.

Regarding a ratio between the negative electrode active material and the solid electrolyte included in negative electrode mixture layer 232, when a value obtained by dividing the weight of the negative electrode active material by the weight of the solid electrolyte is set as a weight ratio, the weight ratio is preferably in a range of 1 to 19. The reason why the weight ratio is preferably in the above-described range is that both a lithium ion conduction path and an electron conduction path in negative electrode mixture layer 232 are likely to be secured.

C-1-2. Solid Electrolyte

As the solid electrolyte included in negative electrode mixture layer 232, the solid electrolyte described above in B-1-2. Solid Electrolyte may be used. Therefore, here, the description will not be repeated.

C-1-3. Binder

As the binder included in negative electrode mixture layer 232, the binder described above in B-1-3. Binder may be used. Therefore, here, the description will not be repeated.

C-1-4. Conductive Additive

As the conductive additive included in negative electrode mixture layer 232, the conductive additive described above in B-1-4. Conductive Additive may be used. Therefore, here, the description will not be repeated.

C-2. Negative Electrode Current Collector

As negative electrode current collector 231, for example, a foil-shaped body, a plate-shaped body, or a net-shaped body formed of SUS, gold, platinum, zinc, copper, nickel, titanium, tin, or an alloy of two or more kinds thereof can be used.

In addition, the thickness and the shape of negative electrode current collector 231 may be appropriately selected depending on the use of the all-solid-state battery.

D. Solid Electrolyte Layer

Solid electrolyte layer 221 according to the embodiment will be described using FIG. 2.

Solid electrolyte layer 221 according to the embodiment includes at least a solid electrolyte having lithium ion conductivity. Solid electrolyte layer 221 optionally further includes a binder in order to improve the adhesion strength between particles of the solid electrolyte.

D-1. Solid Electrolyte

As the solid electrolyte included in solid electrolyte layer 221, the solid electrolyte described above in B-1-2. Solid Electrolyte may be used.

Therefore, here, the description will not be repeated.

D-2. Binder

As the binder included in solid electrolyte layer 221, the binder described above in B-1-3. Binder may be used. Therefore, here, the description will not be repeated.

E. Other Configuration

In all-solid-state battery 200 according to the embodiment, although not illustrated in the drawing, a terminal (metal positive electrode lead) may be welded and attached to a surface of positive electrode current collector 211 opposite to positive electrode mixture layer 212. In addition, a terminal (metal negative electrode lead) may be welded and attached to a surface of negative electrode current collector 231 opposite to negative electrode mixture layer 232. The all-solid-state battery to which the terminal is attached, or an all-solid-state battery group obtained by connecting a plurality of all-solid-state batteries may be accommodated in a battery case. The all-solid-state battery or the all-solid-state battery group may be sealed in the battery case in a state where the positive electrode lead and the negative electrode lead are led out to the outside of the battery case.

Hereinafter, all-solid-state battery 200 according to the embodiment will be described.

F. Manufacturing Method

F-1. Method of Manufacturing All-Solid-State Battery

Figure 3:
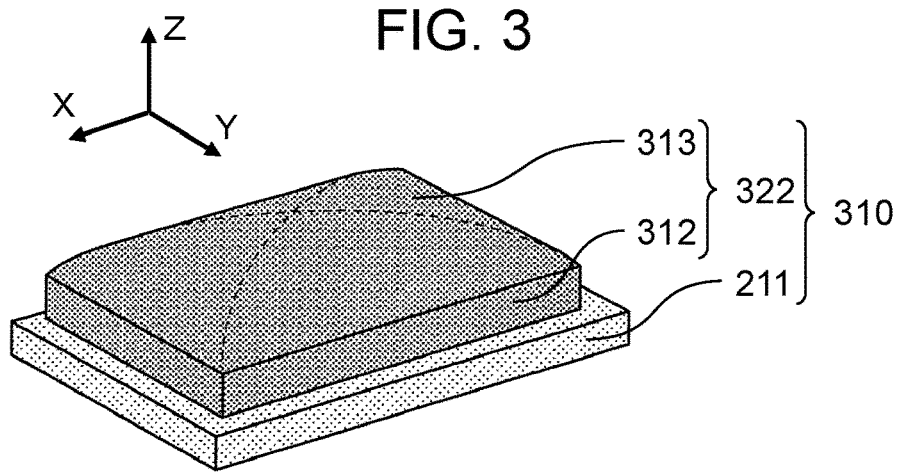
FIG. 3 is a perspective view illustrating a positive electrode layer including a positive electrode mixture layer having a protrusion structure according to the present disclosure.
Figure 4:
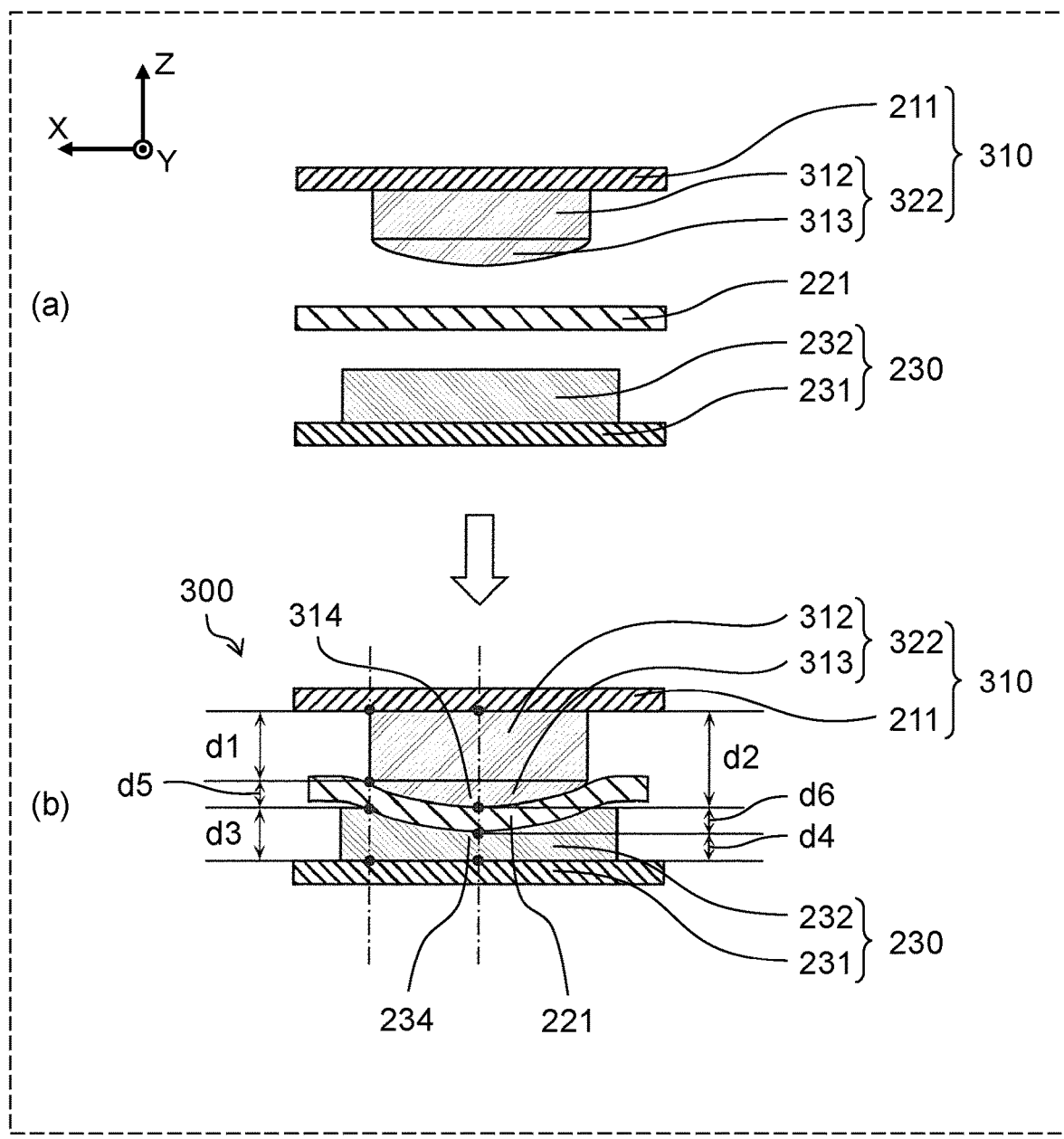
FIG. 4 is a cross-sectional view illustrating states of the all-solid-state battery according to the present disclosure before and after a pressing step.

Next, a method of manufacturing the all-solid-state battery according to the embodiment will be described using FIGS. 3 and 4. FIG. 3 is a perspective view illustrating positive electrode layer 310 according to the embodiment and illustrating a state where positive electrode mixture layer 322 is stacked on positive electrode current collector 211. FIG. 4 is a cross-sectional view illustrating states of all-solid-state battery 300 according to the embodiment before and after a pressing step described below. FIG. 4 illustrates a cross-section obtained by cutting a center portion of all-solid-state battery 300 in a plan view in the stacking direction. As illustrated in (b) of FIG. 4, through respective manufacturing steps described below, all-solid-state battery 300 includes positive electrode layer 310, negative electrode layer 230, and solid electrolyte layer 221, positive electrode layer 310 including positive electrode current collector 211 and positive electrode mixture layer 322 that is stacked on positive electrode current collector 211, negative electrode layer 230 including negative electrode current collector 231 and negative electrode mixture layer 232 that is stacked on negative electrode current collector 231, and solid electrolyte layer 221 being disposed between positive electrode mixture layer 322 and negative electrode mixture layer 232. A method of manufacturing all-solid-state battery 300 according to the embodiment includes a film forming step, a stacking step, and a pressing step. In the film forming step, positive electrode layer 310, negative electrode layer 230, and solid electrolyte layer 221 are prepared, respectively. In the stacking step, positive electrode layer 310, negative electrode layer 230, and solid electrolyte layer 221 are joined or stacked such that solid electrolyte layer 221 is disposed between positive electrode mixture layer 322 and negative electrode mixture layer 232. In the pressing step, the stacked structure obtained in the stacking step is pressed.

F-2. Film Forming Step of Positive Electrode Layer

The film forming step of the positive electrode layer according to the embodiment will be described with reference to FIG. 3. Positive electrode layer 310 includes: positive electrode current collector 211; and positive electrode mixture layer 322 that is stacked on positive electrode current collector 211.

Positive electrode mixture layer 322 includes first positive electrode mixture layer 312 and second positive electrode mixture layer 313, and is formed through a step of forming first positive electrode mixture layer 312 and a step of forming second positive electrode mixture layer 313.

In the film forming step, examples of the method of forming first positive electrode mixture layer 312 include the following two methods.

(1) First positive electrode mixture layer 312 according to the embodiment is formed using, for example, a film forming step including an applying step and a drying and baking step. In the applying step, the positive electrode active material and the solid electrolyte are dispersed in an organic solvent, the binder and the conductive additive are optionally further dispersed in the organic solvent to prepare a slurry, and the obtained slurry is applied to a surface of positive electrode current collector 211. In the drying and baking step, the coating film obtained in the applying step is heated and dried to remove the organic solvent. The method of forming first positive electrode mixture layer 312 optionally includes a coating film pressing step of joining and pressing positive electrode current collector 211 and first positive electrode mixture layer 312 after the drying and baking step.

A method of applying the slurry in the applying step is not particularly limited, and examples thereof include a well-known applying method using a blade coater, a gravure coater, a dip coater, a reverse coater, a roll knife coater, a wire bar coater, a slot die coater, an air knife coater, a curtain coater, an extrusion coater, or a combination thereof.

Examples of the organic solvent used for forming the slurry include heptane, xylene, and toluene. However, the organic solvent is not limited to these examples, and a solvent that does not cause a chemical reaction to occur with an active material may be appropriately selected.

The drying and baking step is not particularly limited as long as the organic solvent can be removed by drying the coating film, and a well-known drying method or baking method using a heater or the like may be adopted. The coating film pressing step is not particularly limited, and a well-known pressing step using a press machine or the like may be adopted.

(2) In addition, first positive electrode mixture layer 312 according to the embodiment is prepared using a film forming step including a powder stacking step and a powder pressing step. In the powder stacking step, the solid electrolyte and the positive electrode active material in a powdered state (state where a slurry is not formed) are mixed with each other, the binder and the conductive additive are optionally further mixed with the positive electrode mixture, and the positive electrode mixture is uniformly stacked on positive electrode current collector 211. In the powder pressing step, a stacked body obtained in the powder stacking step is pressed.

When first positive electrode mixture layer 312 is formed using the method including stacking the positive electrode mixture in the powdered state, the drying step is unnecessary, and there is an advantageous effect in that the manufacturing costs are low. In addition, the solvent not contributing to the capacity of the all-solid-state battery is not likely to remain in the formed positive electrode mixture layer. For example, the solvent concentration in the positive electrode mixture layer is 10 ppm or lower. Similarly, even when the negative electrode mixture layer is formed using the above-described method, the solvent concentration in the negative electrode mixture layer is 10 ppm or lower.

Next, in the film forming step, examples of the method of forming second positive electrode mixture layer 313 include the following two methods.

(1) During the formation of second positive electrode mixture layer 313 according to the embodiment, for example, the positive electrode active material in the powdered state and the solid electrolyte are mixed with other, the binder and the conductive additive are optionally further mixed with the positive electrode mixture, and the positive electrode mixture is stacked on first positive electrode mixture layer 312.

(2) In addition, during the formation of second positive electrode mixture layer 313 according to the embodiment, for example, a mold having a shape of second positive electrode mixture layer 313 is separately prepared, the mold is filled with the positive electrode mixture, the positive electrode mixture is formed into the shape of second positive electrode mixture layer 313, and second positive electrode mixture layer 313 formed into the shape of the mold is stacked on first positive electrode mixture layer 312.

In FIG. 3, second positive electrode mixture layer 313 has a rounded protrusion shape, and has a dome shape that covers the entire upper surface of first positive electrode mixture layer 312. The thickness of the center portion of second positive electrode mixture layer 313 in a plan view (X-Y plane) is the largest in second positive electrode mixture layer 313. The shape of second positive electrode mixture layer 313 is not particularly limited as long as the thickness of the inside of the outer peripheral portion in second positive electrode mixture layer 313 is larger than the thickness of the outer peripheral portion of second positive electrode mixture layer 313 on the X-Y plane. The thickest position in second positive electrode mixture layer 313 is not necessarily the center portion in a plan view (X-Y plane) and may be any position outside the outer peripheral portion in a plan view. The shape of second positive electrode mixture layer 313 may be a shape other than a dome shape, for example, a spherical shape, an oval spherical shape, a conical shape, a pyramid shape, a truncated conical shape, truncated pyramid shape, a prism shape, or a cylindrical shape. In addition, second positive electrode mixture layer 313 does not necessarily cover the entire upper surface of first positive electrode mixture layer 312. That is, in a plan view, a region where a surface of first positive electrode mixture layer 312 can be seen may be present.

In FIG. 3, positive electrode mixture layer 322 has a two-layer structure. However, the thickness of first positive electrode mixture layer 312 may be 0, that is, only second positive electrode mixture layer 313 may be stacked on positive electrode current collector 211 without forming first positive electrode mixture layer 312.

F-3. Film Forming Step of Negative Electrode Layer

Next, the film forming step of the negative electrode layer according to the embodiment will be described with reference to FIG. 4. Negative electrode layer 230 includes: negative electrode current collector 231; and negative electrode mixture layer 232 that is stacked on negative electrode current collector 231. The film forming step of negative electrode layer 230 according to the embodiment is a step of forming negative electrode mixture layer 232 on negative electrode current collector 231 and can be performed using, for example, the following two methods.

(1) Negative electrode layer 230 according to the embodiment is formed using, for example, a film forming step including an applying step and a drying and baking step. In the applying step, the negative electrode active material and the solid electrolyte are dispersed in an organic solvent, the binder and the conductive additive are optionally further dispersed in the organic solvent to prepare a slurry, and the obtained slurry is applied to a surface of negative electrode current collector 231. In the drying and baking step, the coating film obtained in the applying step is heated and dried to remove the organic solvent. The method of forming negative electrode layer 230 optionally includes a coating film pressing step of joining and pressing positive electrode current collector 211 and first positive electrode mixture layer 312 after the drying and baking step.

The method of applying the slurry, the organic solvent used for the formation of the slurry, and the drying and baking step are described above regarding the method of forming first positive electrode mixture layer 312, and thus the description thereof will not be repeated.

(2) In addition, negative electrode layer 230 according to the embodiment is prepared using a film forming step including a powder stacking step and a powder pressing step. In the powder stacking step, the negative electrode active material in a powdered state (state where a slurry is not formed) and the solid electrolyte are mixed with each other, the binder and the conductive additive are optionally further mixed with the negative electrode mixture, and the negative electrode mixture is uniformly stacked on negative electrode current collector 231. In the powder pressing step, a stacked body obtained in the powder stacking step is pressed.

F-4. Film Forming Step of Solid Electrolyte Layer

The film forming step of solid electrolyte layer 221 according to the embodiment is a step of forming solid electrolyte layer 221. In the film forming step, solid electrolyte layer 221 according to the embodiment is prepared using the same method as that of positive electrode layer 210, except that, for example, the solid electrolyte is dispersed in an organic solvent, the binder is further dispersed in the organic solvent to prepare a slurry, and the obtained slurry is applied to a substrate and that a step of removing the substrate is provided after the drying and baking step.

The organic solvent used for preparing the slurry is not particularly limited as long as it does not adversely affect the performance of the solid electrolyte. Examples of the organic solvent include a hydrocarbon organic solvent such as heptane, toluene, or hexane. Among these, a hydrocarbon organic solvent in which the water content is reduced by dehydration is preferable.

The substrate is not particularly limited as long as solid electrolyte layer 221 can be formed on the substrate, a film-shaped flexible or hard substrate is used, and examples thereof include a polyethylene terephthalate (PET) film.

F-5. Stacking Step and Pressing Step

In the stacking step according to the embodiment, positive electrode layer 310, negative electrode layer 230, and solid electrolyte layer 221 obtained in the film forming step are stacked such that solid electrolyte layer 221 is disposed between positive electrode mixture layer 322 and negative electrode mixture layer 232. As a result, a stacked structure is obtained.

In the pressing step according to the embodiment, the stacked structure obtained in the stacking step is pressed from the outside of positive electrode current collector 211 and negative electrode current collector 231 in the stacking direction to obtain all-solid-state battery 300.

An object of the pressing step is to increase the densities of positive electrode mixture layer 322, negative electrode mixture layer 232, and solid electrolyte layer 221. By increasing the densities, the lithium ion conductivity and the electron conductivity in positive electrode mixture layer 322, negative electrode mixture layer 232, and solid electrolyte layer 221 can be improved, and the all-solid-state battery having excellent battery characteristics can be obtained.

All-solid-state battery 300 before and after the pressing step will be described using FIG. 4. As described above, FIG. 4 illustrates a cross-section obtained by cutting a center portion of all-solid-state battery 300 in a plan view in the stacking direction. (a) of FIG. 4 illustrate a state where positive electrode mixture layer 322, negative electrode mixture layer 232, and solid electrolyte layer 221 before the pressing step are separated from each other. However, during pressing, the respective layers in contact with each other are pressed from the outside of positive electrode current collector 211 and negative electrode current collector 231 in the stacking direction. (b) of FIG. 4 illustrates all-solid-state battery 300 after the pressing step. As illustrated in (a) of FIG. 4, in the film forming step, second positive electrode mixture layer 313 is stacked in positive electrode mixture layer 322. Therefore, positive electrode mixture layer 322 has a rounded protrusion shape of a dome shape such that the thickness of the center portion of positive electrode mixture layer 322 in a plan view (X-Y plane) in the stacking direction is the largest. Accordingly, as illustrated in (b) of FIG. 4, even after the pressing step, the thickness of the center portion of positive electrode mixture layer 322 in a plan view in the stacking direction is the largest. That is, positive electrode mixture layer 322 has a rounded protrusion shape protruding toward negative electrode mixture layer 232 such that the thickness of the center portion of positive electrode mixture layer 322 in a plan view (X-Y plane) in the stacking direction (on the stacking axis) is the largest. In other words, positive electrode mixture layer 322 includes protrusion portion 314 that extends toward negative electrode mixture layer 232. Protrusion portion 314 may be positioned inside of the outer peripheral portion of positive electrode mixture layer 322 on the X-Y plane. In the example illustrated in FIG. 4, protrusion portion 314 is positioned at the center portion of positive electrode mixture layer 322 on the X-Y plane.

Positive electrode mixture layer 322 has a rounded protrusion shape such that the thickness of the center portion of positive electrode mixture layer 322 in a plan view in the stacking direction is the largest. A center portion of solid electrolyte layer 221 in a plan view is curved downward toward negative electrode mixture layer 232. By forming solid electrolyte layer 221 to be downwardly curved toward negative electrode mixture layer 232, negative electrode mixture layer 232 is deformed to a rounded recessed shape such that the thickness of the center portion of negative electrode mixture layer 232 in a plan view in the stacking direction is the smallest. The width of the portion of negative electrode mixture layer 232 deformed to the rounded recessed shape is larger than the width of the portion of positive electrode mixture layer 322 having the rounded protrusion shape, that is, the width of second positive electrode mixture layer 313 in FIG. 4. The rounded recessed shape of negative electrode mixture layer 232 is formed to cover the rounded protrusion shape of positive electrode mixture layer 322. That is, negative electrode mixture layer 232 includes recessed portion 234 facing protrusion portion 314 of positive electrode mixture layer 322. Negative electrode mixture layer 232 is recessed toward positive electrode mixture layer 322 side (the positive side of the Z-axis).

As can be seen from the cross-sectional view of all-solid-state battery 300 after the pressing step illustrated in (b) of FIG. 4, the width of negative electrode mixture layer 232 is larger than the width of positive electrode mixture layer 322. In addition, negative electrode mixture layer 232 is disposed to overlap the entire portion of positive electrode mixture layer 322. In addition, in a plan view from the stacking direction (on a plane perpendicular to the stacking axis), the area of negative electrode mixture layer 232 is larger than the area of positive electrode mixture layer 322. On the stacking axis, the entire portion of positive electrode mixture layer 322 overlaps a portion of negative electrode mixture layer 232. As a result, lithium ions that move from positive electrode mixture layer 212 to negative electrode mixture layer 232 side can be suppressed from moving to a region of negative electrode current collector 231 where negative electrode mixture layer 232 is not provided. Accordingly, precipitation of metallic lithium on negative electrode current collector 231 can be suppressed, and an all-solid-state battery having high reliability can be obtained.

As illustrated in (b) of FIG. 4, thickness d2 of the center portion of positive electrode mixture layer 322 is larger than thickness d1 of the outer peripheral portion of positive electrode mixture layer 322, and thickness d4 of the center portion of negative electrode mixture layer 232 is less than thickness d3 of negative electrode mixture layer 232 facing the outer peripheral portion of positive electrode mixture layer 322. Lithium ions that move from positive electrode mixture layer 322 having the rounded protrusion shape move toward negative electrode mixture layer 232 that is formed in the rounded recessed shape to cover positive electrode mixture layer 322 having the rounded protrusion shape. As a result, the negative electrode mixture layer is likely to further receive lithium ions, and the movement of lithium ions toward negative electrode current collector 231 is more likely to be suppressed.

In (b) of FIG. 4, thickness d2 of the center portion of positive electrode mixture layer 322 is the largest in the positive electrode mixture layer, and thickness d4 of the center portion of negative electrode mixture layer 232 is the smallest in the negative electrode mixture layer. However, the present disclosure is not limited to this example. The portion of positive electrode mixture layer 322 having a larger thickness than the thickness of the outer peripheral portion in a plan view in the stacking direction may be provided inside of the outer peripheral portion of positive electrode mixture layer 322 in a plan view. The thickness of negative electrode mixture layer 232 in the stacking direction at a position facing the portion of positive electrode mixture layer 322 having a larger thickness in the stacking direction than the thickness of the outer peripheral portion in a plan view in the stacking direction may be less than the thickness of the outer peripheral portion of negative electrode mixture layer 232 in a plan view in the stacking direction. In addition, the thickness of the center portion of positive electrode mixture layer 322 in a plan view in the stacking direction may be larger than the thickness of the outer peripheral portion of positive electrode mixture layer 322 in a plan view in the stacking direction. In addition, the thickness of the center portion of negative electrode mixture layer 232 in a plan view in the stacking direction may be smaller than the thickness of the outer peripheral portion of the negative electrode mixture layer in a plan view in the stacking direction. The shape of positive electrode mixture layer 322 can be adjusted by adjusting the shape of second positive electrode mixture layer 313 and the positional relationship between first positive electrode mixture layer 312 and second positive electrode mixture layer 313.

In all-solid-state battery 300 after the pressing step, a ratio of thickness d2 of the portion of positive electrode mixture layer 322 having the largest thickness in the stacking direction (in (b) of FIG. 4, thickness d2 of the center portion of positive electrode mixture layer 322) to thickness d1 of the outer peripheral portion of positive electrode mixture layer 322 in the stacking direction is set as d2/d1. At this time, the value of d2/d1 is preferably 1.03 or higher and 1.10 or lower. In other words, thickness d2 of the portion of positive electrode mixture layer 322 having the largest thickness in the stacking direction (in (b) of FIG. 4, thickness d2 of the center portion of positive electrode mixture layer 322) is preferably 103% or higher and 110% or lower thickness d1 of the outer peripheral portion of positive electrode mixture layer 322 in a plan view in the stacking direction. By setting thickness d2 to be 110% or lower thickness d1, a difference in the amount of the positive electrode active material between the portion of positive electrode mixture layer 322 having the largest thickness in the stacking direction (in (b) of FIG. 4, the center portion of positive electrode mixture layer 322) and the outer peripheral portion of positive electrode mixture layer 322 can be suppressed. Therefore, a variation in charge-discharge characteristics of all-solid-state battery 300 in a plane direction (on the X-Y plane) can be suppressed.

In addition, thickness d4 of the portion of negative electrode mixture layer 232 having the smallest thickness in the stacking direction (in (b) of FIG. 4, thickness d4 of the center portion of negative electrode mixture layer 232) is preferably 90% or higher and 97% or lower thickness d3 of negative electrode mixture layer 232 in the stacking direction at a position facing the outer peripheral portion of positive electrode mixture layer 322 in a plan view. By setting thickness d4 to be 90% or higher thickness d3, a difference in the amount of the negative electrode active material between the portion of negative electrode mixture layer 232 having the largest thickness in the stacking direction (in (b) of FIG. 4, the center portion of negative electrode mixture layer 232) and the position facing the outer peripheral portion of positive electrode mixture layer 322 in a plan view can be suppressed. Therefore, a variation in charge-discharge characteristics of all-solid-state battery 300 in a plane direction can be suppressed. In addition, by setting thickness d4 to be 97% or lower thickness d3, the negative electrode mixture layer has the recessed shape suitable for further receiving lithium ions.

In addition, a difference between thickness d6 of a portion of solid electrolyte layer 221 in the stacking direction at the same position in a plan view as that of the portion of positive electrode mixture layer 322 having the largest thickness in the stacking direction (in (b) of FIG. 4, thickness d6 at a position facing the center portion of positive electrode mixture layer 322) and thickness d5 of the solid electrolyte layer in the stacking direction at a position facing the outer peripheral portion of positive electrode mixture layer 322 in a plan view is preferably 5% or lower thickness d6 of the portion of solid electrolyte layer 221 in the stacking direction at the same position in a plan view as that of the portion of positive electrode mixture layer 322 having the largest thickness in the stacking direction. As a result, a variation in distance between the positive electrode mixture layer and the negative electrode mixture layer can be suppressed, and the charge and discharge of all-solid-state battery 300 can be stabilized.

(b) of FIG. 4 is a diagram illustrating the protrusion shape and the recessed shape of positive electrode mixture layer 322 and negative electrode mixture layer 232 in an exaggerated manner, and a shape, a positional relationship, and a dimensional ratio may be different from the actual ones.

Hereinafter, the all-solid-state battery according to the present disclosure has been described based on the embodiment. However, the present disclosure is not limited to the embodiment. Within a range not departing from the scope of the present disclosure, various modifications conceived by those skilled in the art applied to the embodiment or another embodiment constructed by a combination of some components in the embodiment are included in the range of the present disclosure.

The positive electrode layer, the negative electrode layer, the solid electrolyte layer, and the all-solid-state battery including the respective layers according to the present disclosure is expected to be applicable to power supplies such as a portable electronic apparatus or various batteries such as an on-vehicle battery.

What is claimed is:

1. An all-solid-state battery comprising:
a positive electrode layer including a positive electrode current collector and a positive electrode mixture layer, the positive electrode mixture layer being stacked on the positive electrode current collector along a stacking axis and including a positive electrode active material and a first solid electrolyte;
a negative electrode layer including a negative electrode current collector and a negative electrode mixture layer, the negative electrode mixture layer being stacked on the negative electrode current collector along the stacking axis and including a negative electrode active material and a second solid electrolyte; and
a solid electrolyte layer that is disposed between the positive electrode mixture layer and the negative electrode mixture layer and includes a third solid electrolyte having ion conductivity,
wherein on a plane perpendicular to the stacking axis, an area of the negative electrode mixture layer is larger than an area of the positive electrode mixture layer,
on the stacking axis, an entire portion of the positive electrode mixture layer overlaps a portion of the negative electrode mixture layer, and
a peripheral portion of the negative electrode mixture layer is not overlapped by the positive electrode mixture layer; and
wherein the positive electrode mixture layer has a single protrusion portion that is positioned inside of an outer peripheral portion of the positive electrode mixture layer on the plane and extends toward the negative electrode mixture layer,
the negative electrode mixture layer has a recessed portion facing the single protrusion portion, and
the single protrusion portion is positioned at a center portion of the positive electrode mixture layer on the plane, and
wherein on a plane perpendicular to the stacking axis, the single protrusion portion has a width that is equal to a width of the positive electrode mixture layer.

2. The all-solid-state battery of claim 1,
wherein a thickness of the center portion of the positive electrode mixture layer on the stacking axis is the largest in the positive electrode mixture layer, and a thickness of a center portion of the negative electrode mixture layer on the plane on the stacking axis is the smallest in the negative electrode mixture layer.

3. The all-solid-state battery of claim 2,
wherein a thickness of a portion of the positive electrode mixture layer having the largest thickness on the stacking axis is 103% or higher and 110% or lower of a thickness of the outer peripheral portion of the positive electrode mixture layer on the stacking axis.

4. The all-solid-state battery of claim 2,
a thickness of a portion of the negative electrode mixture layer having the smallest thickness on the stacking axis is 90% or higher and 97% or lower of a thickness of the negative electrode mixture layer on the stacking axis at a position facing the outer peripheral portion of the positive electrode mixture layer.

5. The all-solid-state battery of claim 2,
wherein a difference between a thickness of the solid electrolyte layer on the stacking axis at a position facing a portion of the positive electrode mixture layer having a largest thickness on the stacking axis and a thickness of the solid electrolyte layer on the stacking axis at a position facing an outer peripheral portion of the positive electrode mixture layer on the plane is 5% or lower of the thickness of the solid electrolyte layer on the stacking axis at the position facing the portion of the positive electrode mixture layer having the largest thickness on the stacking axis.

6. The all-solid-state battery of claim 2,
wherein at least one of the positive electrode mixture layer and the negative electrode mixture layer includes a binder.

7. The all-solid-state battery of claim 2,
wherein at least one of the positive electrode mixture layer and the negative electrode mixture layer includes a conductive additive.

8. The all-solid-state battery of claim 2,
wherein a concentration of a solvent in at least one of the positive electrode mixture layer and the negative electrode mixture layer is 10 ppm or lower.

* * * * *